United States Patent
Kim et al.

(10) Patent No.: US 8,311,175 B2
(45) Date of Patent: Nov. 13, 2012

(54) TDD COMMUNICATION APPARATUS AND OPERATION METHOD THEREOF

(75) Inventors: Jin Kyung Kim, Daejeon (KR); Sung Weon Kang, Daejeon (KR); Tae Wook Kang, Daejeon (KR); Kyung Soo Kim, Daejeon (KR); Sung Eun Kim, Seoul (KR); Jung Bum Kim, Daejeon (KR); Duck Gun Park, Daejeon (KR); Hyung Il Park, Daejeon (KR); In Gi Lim, Daejeon (KR); Chang Hee Hyoung, Daejeon (KR); Jung Hwan Hwang, Daejeon (KR); Ki Hyuk Park, Daejeon (KR); Jae Hoon Shim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 12/677,158

(22) PCT Filed: Apr. 11, 2008

(86) PCT No.: PCT/KR2008/002037
§ 371 (c)(1),
(2), (4) Date: Mar. 9, 2010

(87) PCT Pub. No.: WO2009/035196
PCT Pub. Date: Mar. 19, 2009

(65) Prior Publication Data
US 2011/0013545 A1  Jan. 20, 2011

(30) Foreign Application Priority Data
Sep. 11, 2007  (KR) .......................... 10-2007-0091954

(51) Int. Cl.
*H04L 7/02* (2006.01)

(52) U.S. Cl. ........................................ 375/359; 375/355
(58) Field of Classification Search .................. 327/165, 327/7, 12; 398/155, 154; 375/331, 355, 375/211, 359
See application file for complete search history.

(56) References Cited

U.S. PATENT DOCUMENTS
| | | |
|---|---|---|
| 5,241,543 A | 8/1993 | Amada et al. |
| 5,631,757 A | 5/1997 | Bodeep et al. |
| 5,942,949 A | 8/1999 | Wilson et al. |

(Continued)

FOREIGN PATENT DOCUMENTS
CN  1852087 A  10/2006
(Continued)

OTHER PUBLICATIONS
International Search Report for PCT/KR2008/002037 filed on Apr. 11, 2008.

(Continued)

*Primary Examiner* — Chandrahas Patel

(57) ABSTRACT

A Time Division Duplex (TDD) communication apparatus and an operation method thereof can provide operation clock signals in the transmission and reception of the TDD communication apparatus using a Clock Recovery & Data Retiming (CDR) circuit, thereby stabilizing an operation without any crystal oscillator and reducing the power consumption. In a transmission time interval, a transmitting frame is processed using a clock signal of a reference frequency generated from the CDR circuit. In a reception time interval, a receiving frame is processed using a clock signal recovered from the receiving frame by the CDR circuit.

6 Claims, 4 Drawing Sheets

U.S. PATENT DOCUMENTS

| | | | |
|---|---|---|---|
| 6,965,660 | B2 | 11/2005 | Strohmayer |
| 7,203,224 | B2 * | 4/2007 | Scott et al. .................. 375/220 |
| 2002/0071512 | A1 | 6/2002 | Strohmayer |
| 2004/0258188 | A1 | 12/2004 | Kim et al. |
| 2007/0030079 | A1 | 2/2007 | Kawamoto et al. |
| 2007/0091935 | A1 | 4/2007 | Yonezawa et al. |

FOREIGN PATENT DOCUMENTS

| | | |
|---|---|---|
| JP | 2000-299658 A | 10/2000 |
| KR | 1020040110209 A | 12/2004 |
| KR | 1020070044556 A | 4/2007 |
| WO | WO 95/33346 | 12/1995 |
| WO | WO 2007/049845 A2 | 5/2007 |

OTHER PUBLICATIONS

Written Opinion of the International Searching Authority for PCT/KR2008/002037 filed on Apr. 11, 2008.

German Office Action of Application No. 112008002417.0 which is the counter part of prior Application No. PCT/KR2008/002037 and its English translation.

* cited by examiner

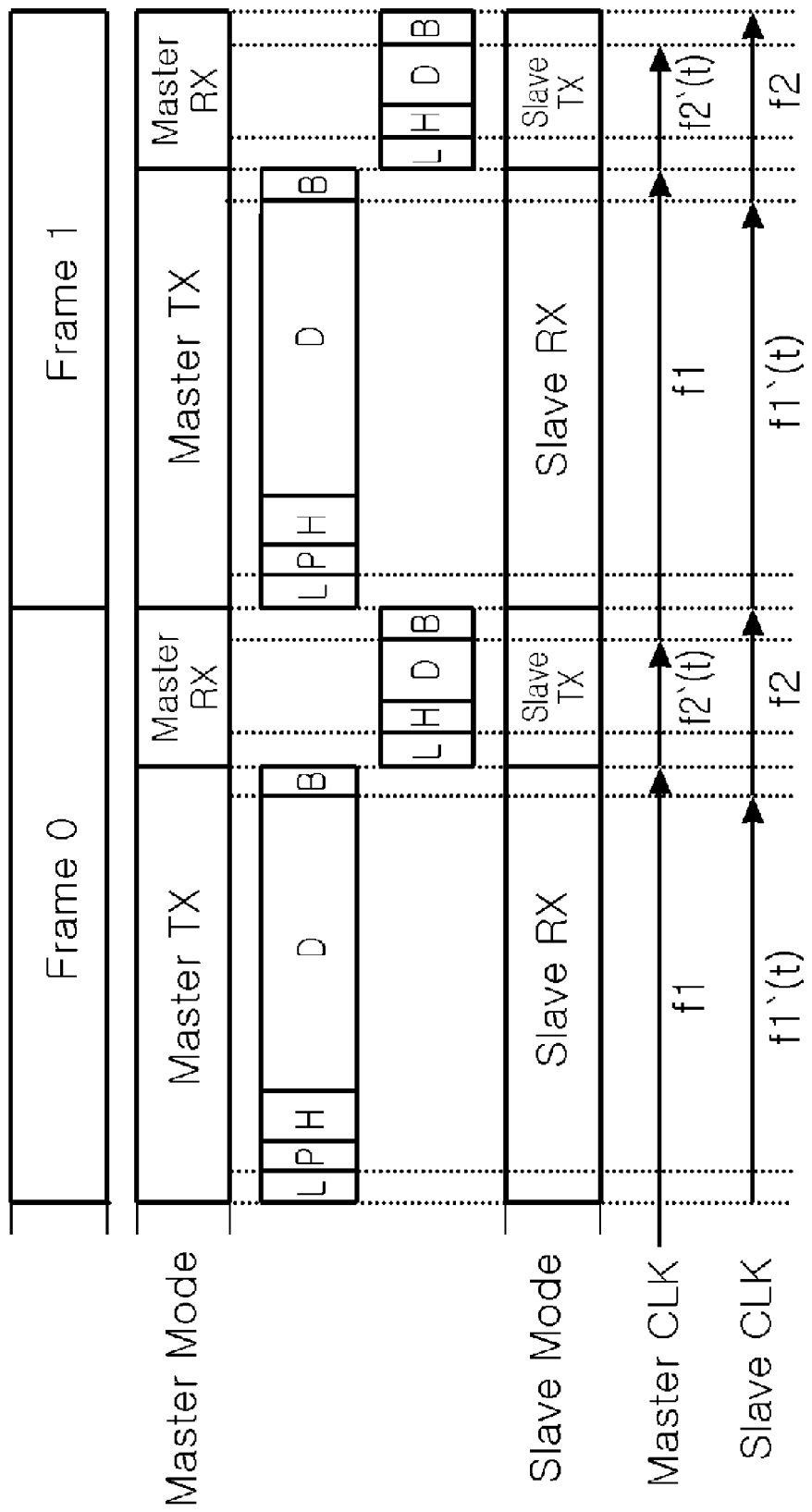
[Fig. 1]

[Fig. 2]
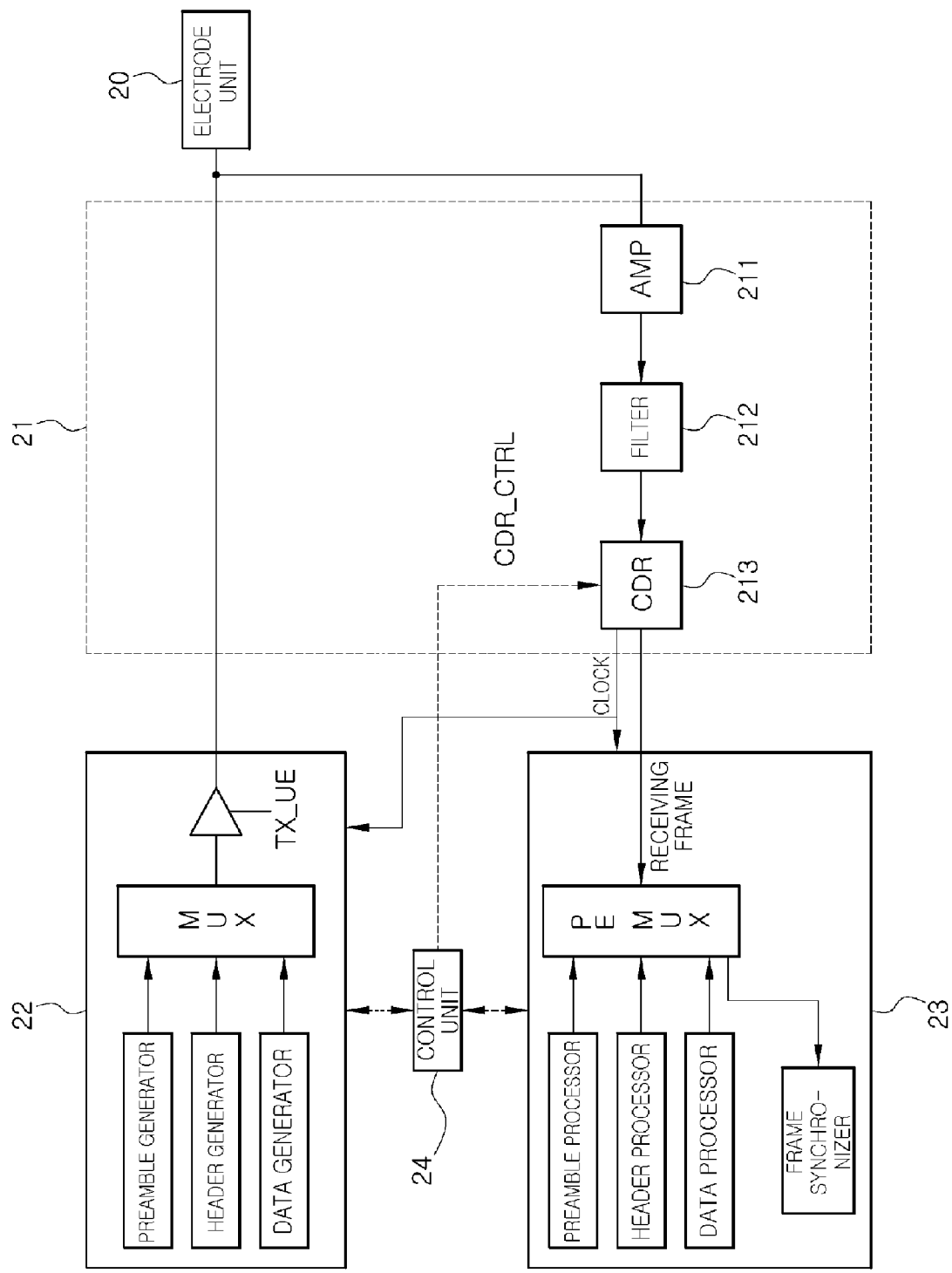

[Fig. 3]
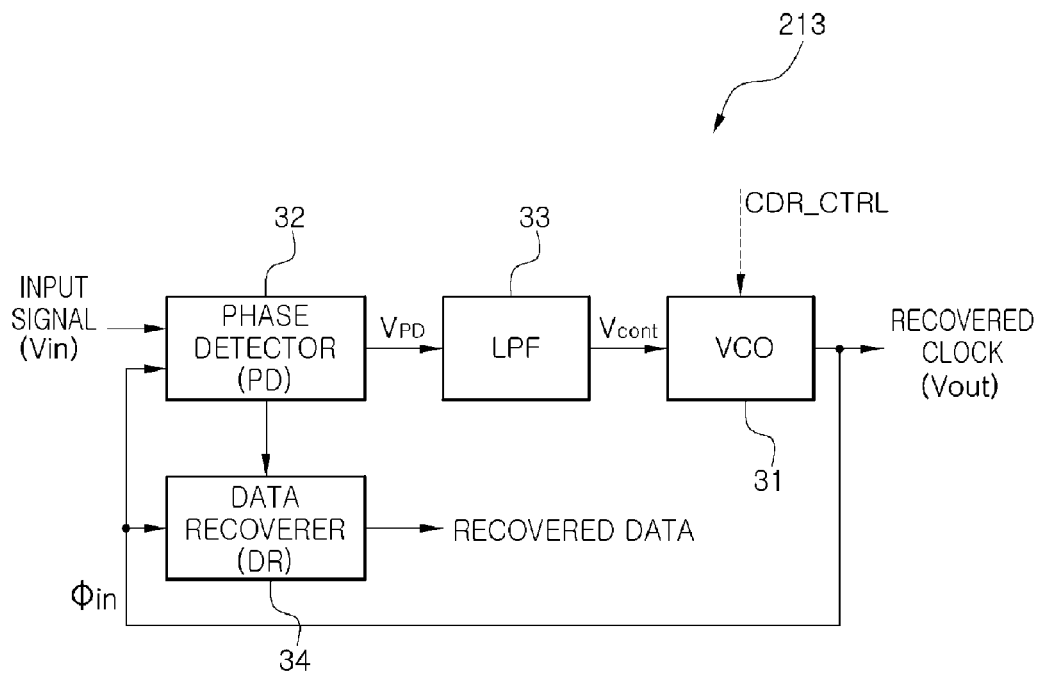

[Fig. 4]
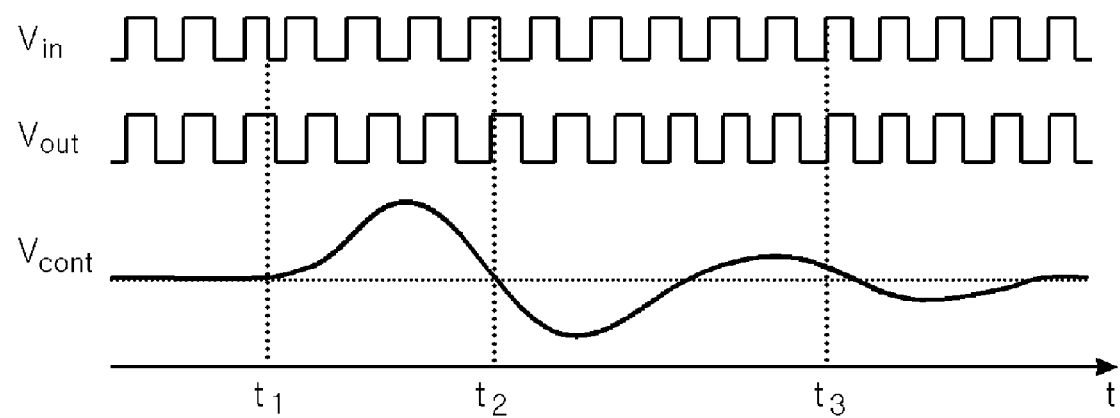

TDD COMMUNICATION APPARATUS AND OPERATION METHOD THEREOF

TECHNICAL FIELD

The present invention relates to a communication apparatus for transmitting and receiving a frame in a Time Division Duplex (TDD) scheme, and more particularly, to a TDD communication apparatus and an operation method thereof that can generate clock signals, which are used to process a transmitting frame and a receiving frame, using a Clock Recovery & Data Retiming (CDR) circuit used for clock and data recovery of the receiving frame, in order to reduce the number of used devices and the power consumption while enabling quick stabilization.

The invention has been supported by ITR&D Program of MIC/IITA [2006-S-072-02, Human Body Communication Control unit, SoC].

BACKGROUND ART

A TDD scheme is a two-way transmission scheme that allocates uplink and downlink alternately in a time sequence in one frequency band. The TDD scheme has higher efficiency than a Frequency Division Duplex (hereinafter, referred to as FDD) scheme that allocates different frequencies to uplink and downlink, and also has a characteristic to be suitable for transmitting asymmetric or bursting applications. According to this advantage, the TDD scheme is being applied to various communication fields such as the portable Internet in 2.3 GHz band and the like.

A communication field using the TDD scheme may include human body communication recently being studied.

The human body communication transmits a signal by using a human body rather than by using a wire. In the human body communication, the electrical signal is transmitted through the human body without using electric wires since the human body acts as a conductive medium. As personal portable electronic devices are recently diversified, the human body communication is in the limelight in that data transmission and reception between the electronic devices can be easily realized. In addition, the human body communication can be used to transmit results of measurement from various devices, which measure human health states, to other devices such as a computer and the like. Like this, its application fields may be infinite.

On the other hand, a CDR circuit is a device that generates a clock signal, which is synchronized with an input data signal, and recovers a data signal, which is distorted in course of transmission using the clock signal.

The CDR circuit is used in a wide range of various communication fields including human body communication, a disk drive, and the like.

In general, the CDR circuit is implemented with a Phase Lock Loop (PLL). The CDR circuit detects, through a phase detector, a phase difference between an output frequency of a variable oscillator, which has an oscillating frequency variable in response to a control signal input, and an input data signal of the variable oscillator, and then controls the variable oscillator to reduce the phase difference, thereby generating a clock signal having a frequency synchronized with an input data signal.

DISCLOSURE OF INVENTION

Technical Problem

However, when a conventional communication apparatus is realized for two-way human body communication in the TDD scheme, the communication apparatus additionally uses an crystal oscillator to synchronize the operation clock of a transmitter for performing various processes for data to be transmitted, such as preamble generation, header generation, modulation and scrambling, and a receiver for performing various processes for data received, such as demodulation, descrambling and error correction. In this case, there is a problem in that the cost and the power consumption increase due to the additionally used crystal oscillator.

Moreover, the conventional human body communication apparatus only uses the CDR circuit to recover a clock and data of a receiving signal, but never considers clock stabilization using the CDR circuit.

Accordingly, the present invention is to stabilize the clock of a TDD communication apparatus using a CDR circuit without a crystal oscillator.

Technical Solution

According to an aspect of the present invention, there is provided a Time Division Duplex (TDD) communication apparatus for alternately transmitting and receiving a frame through time division, which includes an analog front end for outputting a transmitting frame to outside, receiving a receiving frame from outside, and recovering a clock and data of a receiving signal through a Clock Recovery & Data Retiming (CDR) circuit; a transmitter for generating the transmitting frame by operating with a clock signal of a reference frequency, which is generated from the CDR circuit, in a transmission time interval; and a receiver for processing data, which is recovered in the analog front end, by operating with a clock signal, which is recovered from the receiving frame by the CDR circuit, in a reception time interval.

The TDD communication apparatus may further include a control unit for controlling the CDR circuit to output the clock signal of the reference frequency in the transmission time interval and to output the clock signal recovered from the receiving frame in the reception time interval.

The control unit may control the CDR circuit to output the clock signal of the reference frequency when there is no receiving frame input from outside in the reception time interval.

The CDR circuit may include a voltage control oscillator for generating a signal of a preset reference frequency under control of the control unit, and generating a signal of a variable frequency corresponding to an input control voltage; a phase detector for detecting a phase difference of the receiving frame and the signal output from the voltage control oscillator; and a low pass filter for generating the control voltage in response to the phase difference detected in the phase detector.

According to another aspect of the present invention, there is provided an operation method of a TDD communication apparatus including a CDR circuit, which includes procedures of: generating and transmitting a transmitting frame using a clock signal of a reference frequency, which is generated from the CDR circuit, in a transmission time interval; and recovering a clock and data of a receiving frame through the CDR circuit, and demodulating the data on a basis of the clock, which is recovered in the CDR circuit, in a reception time interval.

In the operation method, the CDR circuit may be controlled to generate the clock signal of the reference frequency preset at a data transmission rate in the transmission time interval and to output the clock signal recovered from the receiving frame in the reception time interval. The CDR circuit may be controlled to generate the clock signal of the reference frequency when there is no receiving frame in the reception time interval.

Furthermore, in the TDD communication apparatus and the operation method thereof, the reference frequency may correspond to a data transmission rate in the TDD communication apparatus, and each of the transmitting frame and the receiving frame may include a lock time interval configured of a signal having a given pattern, which is transmitted temporally prior to valid data so as to reduce data loss.

Advantageous Effects

According to an embodiment of the present invention as set forth above, the TDD communication apparatus can enable stable communication by generating operation clocks of a transmitter and a receiver using a CDR circuit, which is used to recover a clock and data of a receiving frame, without using an additional crystal oscillator. The TDD communication apparatus can also reduce the power consumption and the cost by removing the crystal oscillator.

BRIEF DESCRIPTION OF THE DRAWINGS

FIG. 1 is a diagram illustrating a data transmission and reception flow and a frame structure according to an operation method of a TDD communication apparatus according to the present invention, FIG. 2 is a block diagram illustrating an embodiment of the TDD communication apparatus according to the present invention, FIG. 3 is a block diagram illustrating an example of configuration of the CDR circuit applied to the present invention, and FIG. 4 is a timing diagram illustrating an operation of the CDR circuit of FIG. 3.

BEST MODE FOR CARRYING OUT THE INVENTION

Hereinafter, preferred embodiments of the present invention will be described in detail herein below with reference to the accompanying drawings. Descriptions of well-known functions and constructions are omitted for clarity and conciseness.

In the drawings, the same or similar elements are denoted by the same reference numerals even though they are depicted in different drawings.

Throughout this specification and the claims that follow, it will be understood that when an element is referred to as being "connected to" or "coupled to" another element, it includes not only a case of "directly connected or coupled to" the other element, but also a case of "indirectly connected or coupled to" the other element via an intervening element. Unless explicitly described to the contrary, the word "comprise," and variations such as "comprises" or "comprising," will be understood to imply the inclusion of stated elements but not the exclusion of any other elements.

FIG. 1 is a diagram showing a data transmission and reception flow and a frame structure for explaining an operation method of a TDD communication apparatus according to a preferred embodiment of the present invention. A basic concept of the present invention will be described with reference to FIG. 1.

The present invention is intended to reduce the power consumption while promoting clock stabilization in the TDD communication apparatus, which has the CDR circuit used for clock and data recovery, by providing reference clocks for the processing of a transmitting frame and a receiving frame using a CDR circuit.

The CDR circuit can be realized in various forms. Hereinafter, there will be described an example of the most basic configuration implemented with a PLL structure configured of a phase detector, a low pass filter, and a voltage control oscillator. For example, a human body communication apparatus will be described as an example of the TDD communication apparatus, but is not limited thereto.

In general, transmission and reception are performed alternately in a time axis in the case of a TDD communication scheme. In the case of human body communication, a slave performs a reception when a master performs a transmission, and the slave performs the transmission when the master performs the reception. Herein, the master and the slave serve as human body communication devices for transmitting and receiving data in contact with or in the vicinity of a human body, and are identified according to a communication subject.

Referring to FIG. 1, a frame is transmitted and received at a given time interval in the TDD human body communication, and the master and slave alternately perform the transmission and the reception within frame transmission and reception periods. At this time, the master and slave, in the case of transmission, generate and transmit a frame in synchronization with a clock signal of a reference frequency generated from the CDR circuit thereof, and in the case of reception, demodulate data by processing a received frame in response to a clock recovered from the received frame.

That is, when the master is in transmission mode (Master TX) and the slave is in reception mode (Slave RX) in FIG. 1, a clock frequency of the master is a center frequency f1 of the CDR circuit provided in the master, and a clock frequency of the salve is a clock frequency f1'(t), which is recovered from a received frame transmitted in synchronization with the frequency f1. On the contrary, when the master is in reception mode (Master RX) and the slave is in transmission mode (Slave TX), the clock frequency of the slave is a center frequency f2 of the CDR circuit provided in the slave, and the clock frequency of the master is a clock frequency f2'(t), which is recovered from the received frame transmitted in synchronization with the frequency f2.

At this time, a frame transmitted and received between the master and the slave includes a lock time (L) section, a preamble (P) section, a header (H) section, and a data (D) section. The L section is configured with meaningless data of a given pattern (for example, 101010) to be synchronized with a clock frequency of the received frame when a receiving side receives a corresponding frame. The receiving side can minimize data loss by receiving actually valid data after the clock frequency is stabilized to some degree by the signal of the L section. Since noise is usually received from outside in the case of actual human body communication, the operation frequency may be in a frequency band different from a desired operation frequency due to the noise in a state in which a signal is not exchanged. When the receiving side suddenly receives a signal while operating according to the noise, synchronization is not acquired for some initial time and therefore received data is lost. This problem can be prevented by including the L section.

The P section is a section for synchronizing transmission timing between the master and the slave, and provides information for enabling the slave to correctly recover received data. The H section includes identification information of the slave to receive a corresponding data frame, and indicates a frame destination. The D section transmits actual data to be transferred between the master and the slave.

FIG. 2 is a schematic block diagram illustrating a configuration of the human body communication apparatus as an embodiment of the TDD communication apparatus according to the present invention.

Referring to FIG. 2, the human body communication apparatus includes an electrode unit 20 disposed in contact with or in the vicinity of the human body to transfer a signal to or receive a signal from a human body, an analog front end 21 for outputting a transmitting frame to outside through the electrode unit 20 or receiving a receiving frame from outside to recover a clock and data of the receiving frame through the CDR circuit, a transmitter 22 for generating the transmitting frame by operating with a clock signal of a reference frequency generated from the CDR circuit in a transmission time interval, a receiver 23 for demodulating the receiving frame by operating with a clock recovered from the receiving frame in the CDR circuit in a reception time interval, and a control unit 24 for controlling the CDR circuit to output the clock signal of the reference frequency in the transmission time interval and to output the clock recovered from the receiving frame in the reception time interval.

As illustrated, the analog front end 21 includes an amplifier 211 for amplifying a reception signal from the electrode unit 20, a filter 212 for removing out-of-band noise from the received signal amplified in the amplifier 211, and a CDR circuit 213 for recovering a clock synchronized with the receiving frame from the reception signal passed through the filter 212 and recovering data of the receiving frame on the basis of the clock. The analog front end 21 can further include another element, such as an amplifier for amplifying the transmitting frame output from the transmitter 22, or can be modified differently.

The transmitter 22 generates and transmits a frame to be transmitted including an L section illustrated in FIG. 1, and, for example, can include a preamble generator, a data generator, a multiplexer, an amplifier, and the like. The transmitter 22 can further include a scrambler, a modulator, and the like to improve communication characteristics and security characteristics. In the present invention, a detailed configuration of the transmitter 22 is not specified.

Similarly, the receiver 23 receives a frame including the L section to demodulate original data, and, for example, can include a demultiplexer, a preamble processor, a header processor and a frame synchronizer. If needed, the receiver 23 can further include a descrambler, a demodulator, and the like. In the present invention, a detailed configuration of the receiver 23 is not specified.

The present invention do not include a separate crystal oscillator for generating an operation clock signal, but the transmitter 22 and the receiver 23 provided in the communication apparatus according to the present invention are realized to operate on the basis of a clock frequency by receiving a clock signal, which is generated from the CDR circuit 213 of the analog front end 21.

At this time, the CDR circuit 213 is controlled by a control unit 24. When a transmission operation is performed in the corresponding communication apparatus, a clock signal of a preset reference frequency, that is, a clock signal having a center frequency of a variable oscillator provided in the CDR circuit 213, is an output. When a reception operation is performed, a clock is recovered from a receiving frame input from the electrode unit 20, and then the recovered clock signal is an output. Since a clock of a different frequency due to external noise can be generated when there is no input receiving frame in the reception time interval, the control unit 24 can control the CDR circuit 213 to output the clock signal of the preset reference frequency when there is no reception signal input from outside in the reception time interval. Accordingly, the reference frequency is set at a data rate, such that a time for recovering and stabilizing a clock frequency from a receiving frame can be further shortened.

FIG. 3 is a block diagram illustrating an example of configuration of the CDR circuit 213.

Referring to FIG. 3, the CDR circuit 213 outputs a frequency signal corresponding to a clock of an input signal Vin from the voltage control oscillator 31 through a voltage control oscillator 31 for varying an oscillating frequency with a voltage control signal, a phase detector 32 for detecting a phase difference between an input signal and an output frequency of the voltage control oscillator 31, and a low pass filter 33 for generating the voltage control signal according to the phase difference detected from the phase detector 32. The CDR circuit 213 receives a clock output from the voltage control oscillator 31 and data latched in the phase detector 32 to recover the data through a data recoverer 34.

FIG. 4 is a timing diagram illustrating general operation characteristics of the CDR circuit 213. As illustrated, a control voltage Vcont for the voltage control oscillator 31 is adjusted in a direction that a phase difference is reduced in comparison with an output signal Vout of the voltage control oscillator 31 when a signal Vin of a distorted operation frequency is inputted.

In the CDR circuit 213, the voltage control oscillator 31 generates a preset reference frequency signal in response to a control signal CDR_CTRL, or generates an oscillating frequency based on a control voltage input from the low pass filter 33. Since the center frequency of the voltage control oscillator 31 is adjusted at a data rate, the reference frequency is set to the center frequency of the voltage control oscillator 31.

While the invention has been shown and described in connection with the exemplary embodiments, it will be apparent to those skilled in the art that modifications and variations can be made without departing from the spirit and scope of the invention.

The invention claimed is:

1. A time division duplex communication apparatus for alternately transmitting and receiving a frame through time division, comprising:
   an analog front end configured to output a transmitting frame to outside, receive a receiving frame from outside, and recover a clock and data of a receiving signal through a clock recovery and data retiming circuit;
   a transmitter configured to generate the transmitting frame by operating with a clock signal of a reference frequency, which is generated from the clock recovery and data retiming circuit, in a transmission time interval;
   a receiver configured to process data, which is recovered in the analog front end, by operating with a clock signal, which is recovered from the receiving frame by the clock recovery and data retiming circuit, in a reception time interval; and
   a control unit configured to control the clock recovery and data retiming circuit to output the clock signal of the reference frequency in the transmission time interval and to output the clock signal recovered from the receiving frame in the reception time interval,
   wherein the control unit controls the clock recovery and data retiming circuit to output the clock signal of the reference frequency when there is no receiving frame input from outside in the reception time interval.

2. The time division duplex communication apparatus according to claim 1, wherein the reference frequency corresponds to a data transmission rate.

3. The time division duplex communication apparatus according to claim 1, wherein each of the transmitting frame and the receiving frame includes a lock time interval configured as a signal having a given pattern, which is transmitted prior to valid data to reduce data loss.

4. The time division duplex communication apparatus according to claim 1, wherein the clock recovery and data retiming circuit includes:
   a voltage control oscillator configured to generate a signal of a preset reference frequency under control of the control unit, and generating a signal of a variable frequency corresponding to an input control voltage;
   a phase detector configured to detect a phase difference of the receiving frame and the signal output from the voltage control oscillator; and
   a low pass filter configured to generate the control voltage in response to the phase difference detected in the phase detector.

5. An operation method of a time division duplex communication apparatus including a clock recovery and data retiming circuit, comprising:
   generating and transmitting a transmitting frame using a clock signal of a reference frequency, which is generated from the clock recovery and data retiming circuit, in a transmission time interval; and
   recovering a clock and data of a receiving frame through the clock recovery and data retiming circuit, and demodulating the data on a basis of the clock, which is recovered in the clock recovery and data retiming circuit, in a reception time interval,
   wherein each of the transmitting frame and the receiving frame includes a lock time interval configured as a signal having a given pattern, which is transmitted prior to valid data to reduce data loss, and
   wherein the clock recovery and data retiming circuit is controlled to generate the clock signal of the reference frequency preset at a data transmission rate in the transmission time interval and to output the clock signal recovered from the receiving frame in the reception time interval.

6. The operation method according to claim 5, wherein the clock recovery and data retiming circuit is controlled to generate the clock signal of the reference frequency when there is no receiving frame in the reception time interval.

* * * * *